June 17, 1930.  O. J. McNEES  1,764,572
VINE LIFTING ATTACHMENT
Filed Aug. 3, 1928
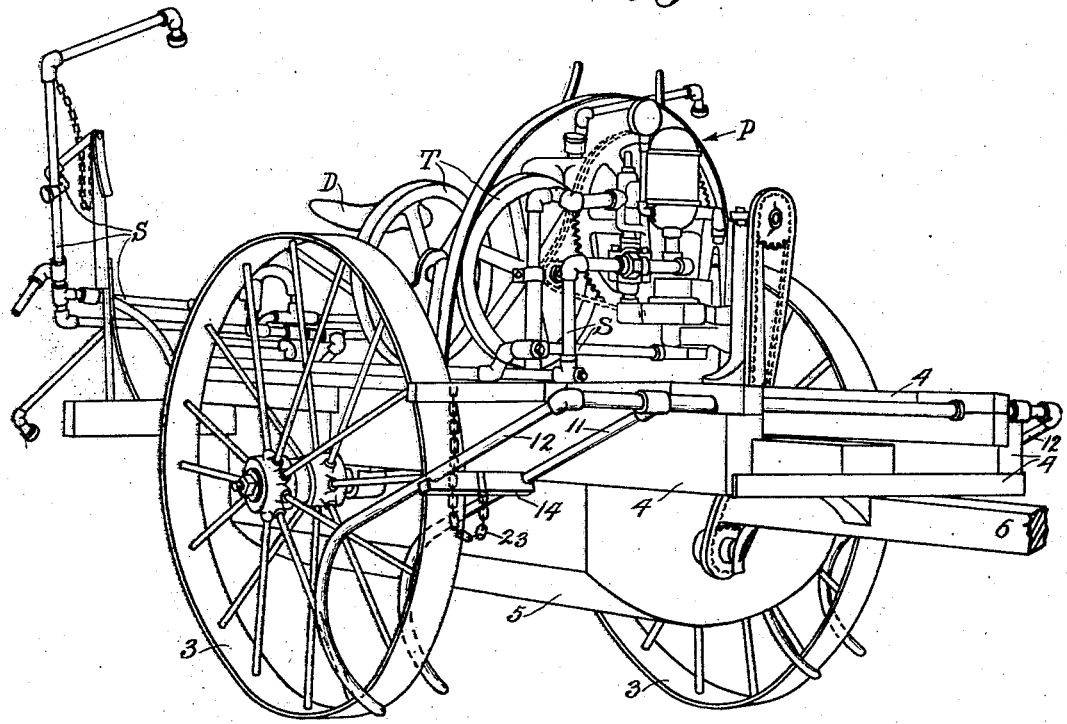
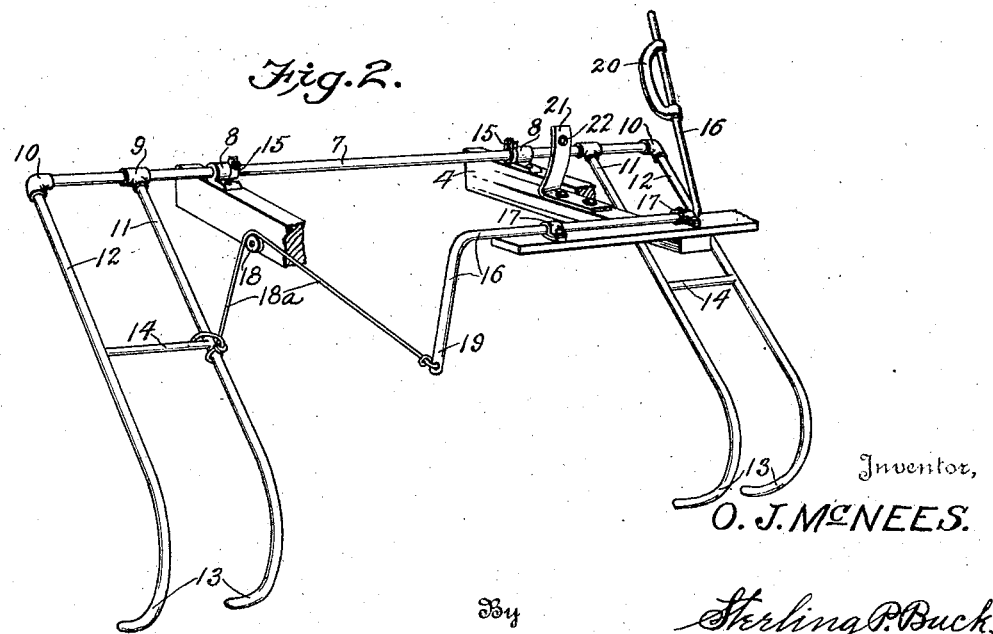
Inventor,
O. J. McNEES.
By Sterling P. Buck,
Attorney.

Patented June 17, 1930

1,764,572

UNITED STATES PATENT OFFICE

OLIVER J. McNEES, OF NEW CASTLE, PENNSYLVANIA

VINE-LIFTING ATTACHMENT

Application filed August 3, 1928. Serial No. 297,159.

This invention relates to vine lifters, and especially to an improved, simple and effective vine-lifting attachment for farm vehicles or traveling machinery, that is, machines which include ground wheels and frames, the frames being carried by the ground wheels.

One object of my invention is to provide a simple, convenient, easily attached, easily operated, and thoroughly practical attachment of this character.

Other objects and important features are pointed out or implied in the following details of description, in connection with the accompanying drawings, in which:

Figure 1 is a perspective view of a traveling spraying machine having my improved vine lifter attached in its operative position.

Figure 2 is a perspective view of the attachment, and fragmental parts of the frame on which the attachment is carried.

Referring to these drawings in detail, in which similar reference characters correspond to similar parts in the several views, and in which the spraying machine is illustrated to show the mounting of the vine-lifting attachment thereon, the invention will be described in detail, but first, it should be understood that the pumping mechanism P, the transmission wheels T and the spraying tubes and nozzles S form no part of the present invention.

The ground wheels 3 support and carry a main frame 4, a liquid tank 5 and a tongue 6, the latter having its front end broken off in Figure 1, and being provided with any usual or proper means for attaching draft animals thereto. Where the attachment is mounted on a motor-driven machine, the tongue 6 will be omitted.

Referring to Figure 2, it will be seen that the vine-lifting attachment includes a horizontal shaft 7 which is mounted in suitable bearings on rear end portions of the frame 4, such bearings being indicated at 8. This shaft 7 is preferably of hollow pipe or tubing, and has T-fittings 9 secured thereon between the bearings 8 and the respective ends of the tube. L-fittings 10 are secured on the ends of the tubular shaft 7, preferably by means of screwthreads (not shown). Hooks 11 and 12 (also preferably of metal tubing) have their upper front ends secured in the fittings 9 and 10, by screw-threads or other appropriate means, and their curved lower ends 13 extend downward and forward, while their upper relatively straight main portions extend upward and forward. These hooks 11 and 12 are arranged in pairs, each pair being at the opposite side of the machine from the other pair, and the hooks of each pair straddle the adjacent ground wheels 3. For the purpose of holding the hooks 11 and 12 of each pair in the substantially parallel relation shown, each pair is provided with a strut 14 which has its ends secured to the respective hooks of its pair. To prevent the connections or fittings 9 and 10 from turning with respect to the shaft 7, each of these fittings may be electrically welded or otherwise permanently secured on said shaft. Collars 15 may be secured on the shaft 7 to prevent longitudinal movement of the latter within its bearings.

For the purpose of lifting the hooks by the operation of a foot of the driver on the driver's seat, which is indicated at D, a combined shaft and lever 16 is mounted in suitable bearings 17 on the frame 4. A pulley or guiding roller 18 is also mounted on the frame 4. A cable or flexible element 18ª has one end tied or secured to the intermediate part of one of the hooks 11, and its other end is secured to a depending lever-arm 19 of the member 16, while the upwardly extending arm of this member 16 has a pedal member 20 secured thereon by any appropriate means.

By reference to the drawings, it will be seen that they show the attachment in reversed positions. It will also be seen that some of the parts shown in Figure 2 are hidden in Figure 1. It should also be understood that the pedal 20 is in a convenient position with respect to the seat D, so the pedal can be swung in its bearings 17 so as to be moved forward and downward into engagement with a spring-catch 21 which has an opening 22 for receiving the upper end of the pedal-arm of the lever 16. This spring-catch is curved so that the pedal-arm will strike its rear surface at a point above the opening 22, and the continuation of its downward movement will bring it into registration with the opening 22, whereupon the spring action of the catch 21 will cause the opening 22 to engage with the pedal-arm, and hold it down, thereby causing the arm 19, cable 18ª and pulley 18 to hold the hooks 11 and 12 up out of engagement with the ground. However, when the foot of the operator presses the upper end of the spring-catch forward, it disengages and frees the pedal-arm, so the latter will be raised in consequence of the weight of the hooks 11 and 12 as they gravitate into contact with the ground. To prevent these hooks 11 and 12 from entering the ground to an undesirable extent, limiting chains 23 may be provided at one or both sides of the machine.

From the foregoing description, it will be seen that when the vehicle or traveling machine is drawn through a field of sweet potatoes or other vines which are to be lifted, the hooks 11 and 12 being in contact with the ground, such vines will be lifted from the ground, for a purpose well known by farmers, and some of the vines will be broken and will adhere to the hooks. The driver can free the hooks from the adhering vines by pressing the pedal-arm downward; and when the vines are freed from the hooks, the latter are permitted to again contact with the ground, for continuing the operation of lifting vines.

By mounting this vine-lifting attachment on a spraying machine, the vines can be simultaneously sprayed and lifted.

Although I have described this embodiment and mounting of my vine-lifting attachment specifically, it is not my intention to limit my patent protection to these exact details of construction and arrangement, for numerous changes can be made within the scope of the inventive ideas as implied and claimed.

What I claim as my invention is:

In a vine-lifting device, the combination with a vehicle including a frame and ground-wheels carrying the frame, of a shaft extending transversely across said frame, bearings in which said shaft is journalled on said frame, two pairs of vine-lifting hooks, each of said pairs being secured on a respective end of said shaft and being spaced from one another and extending downward into position for contact with the ground on opposite sides of the respective ground-wheels, a combined shaft and lever journalled on said frame in rear of the first said shaft, said combined shaft and lever including a depending arm and an upwardly extending arm, a flexible element connected to said depending arm and to one of said hooks, a guiding pulley over which the intermediate part of said flexible element extends, said guiding pulley being carried by said frame, said upwardly extending arm having a pedal thereon and having its upper end extended beyond said pedal, and a spring-catch on said frame and adapted for engagement with the extended end of said upwardly extending arm and to releasably hold said upwardly extending arm in an approximately parallel position in which it cooperates with the said depending arm and flexible element and pulley for holding the hooks out of engagement with the ground.

In testimony whereof I affix my signature.

OLIVER J. McNEES.